United States Patent
Rasanen

(10) Patent No.: US 10,939,232 B2
(45) Date of Patent: Mar. 2, 2021

(54) LOCATION RELATED APPLICATION MANAGEMENT

(71) Applicant: NOKIA TECHNOLOGIES OY, Espoo (FI)

(72) Inventor: John Juha Antero Rasanen, Espoo (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

(21) Appl. No.: 16/468,122

(22) PCT Filed: Dec. 9, 2016

(86) PCT No.: PCT/EP2016/080412
§ 371 (c)(1),
(2) Date: Jun. 10, 2019

(87) PCT Pub. No.: WO2018/103858
PCT Pub. Date: Jun. 14, 2018

(65) Prior Publication Data
US 2020/0068340 A1    Feb. 27, 2020

(51) Int. Cl.
*H04W 24/00* (2009.01)
*H04W 4/021* (2018.01)
(Continued)

(52) U.S. Cl.
CPC .......... *H04W 4/021* (2013.01); *H04L 67/18* (2013.01); *H04W 4/023* (2013.01); *H04W 4/20* (2013.01);
(Continued)

(58) Field of Classification Search
CPC ....... H04W 4/021; H04W 4/023; H04W 4/20; H04W 60/04; H04W 88/02; H04W 1/72522; H04L 67/18; H04M 1/72519
(Continued)

(56) References Cited

U.S. PATENT DOCUMENTS 6,101,387 A    8/2000  Granberg et al.
9,516,467 B1 * 12/2016  Cronin .................. H04W 4/023
(Continued)

FOREIGN PATENT DOCUMENTS

CN    101262495 A    9/2008
CN    102131170 A    7/2011
(Continued)

OTHER PUBLICATIONS

International Search Report and Written Opinion dated Feb. 15, 2017 corresponding to International Patent Application No. PCT/EP2016/080412.
(Continued)

*Primary Examiner* — Danh C Le
(74) *Attorney, Agent, or Firm* — Squire Patton Boggs (US) LLP

(57) ABSTRACT

An apparatus for use by a mobile edge control element or function, the apparatus comprising at least one processing circuitry, and at least one memory for storing instructions to be executed by the processing circuitry, wherein the at least one memory and the instructions are configured to, with the at least one processing circuitry, cause the apparatus at least: to receive and process an event report indicating that location information of a communication element communicating in a communication network are provided, to check location related application information for determining whether or not a relationship of at least one application to a location corresponding to the location information indicated in the event report is present, to prepare, in case the check is affirmative, an application identification indication for indicating at least one location area where location information of the communication element is of relevance for a processing conducted by at least one application, and to
(Continued)

ensure that the communication element is informed about the application identification indication.

11 Claims, 8 Drawing Sheets

(51) Int. Cl.
    *H04L 29/08*     (2006.01)
    *H04W 4/02*     (2018.01)
    *H04W 4/20*     (2018.01)
    *H04W 60/04*     (2009.01)
    *H04M 1/725*     (2021.01)

(52) U.S. Cl.
    CPC ........ *H04W 60/04* (2013.01); *H04M 1/72519* (2013.01); *H04M 1/72522* (2013.01)

(58) Field of Classification Search
    USPC .................................. 455/456.3, 456.1, 418
    See application file for complete search history.

(56) References Cited

U.S. PATENT DOCUMENTS

| | | | |
|---|---|---|---|
| 2009/0059823 A1 | 3/2009 | Bolduc et al. | |
| 2010/0004005 A1* | 1/2010 | Pereira | H04L 67/18 455/457 |
| 2010/0004857 A1* | 1/2010 | Pereira | G01C 21/00 701/533 |
| 2011/0320119 A1* | 12/2011 | Jerez Morales | G01C 21/20 701/516 |
| 2014/0122700 A1* | 5/2014 | Jung | H04L 41/5054 709/224 |
| 2014/0327518 A1* | 11/2014 | Loutit | G05B 19/00 340/7.58 |
| 2014/0329460 A1* | 11/2014 | Loutit | H04W 4/025 455/39 |
| 2014/0368691 A1* | 12/2014 | Boncyk | G06F 16/904 348/222.1 |
| 2015/0084745 A1* | 3/2015 | Hertz | H04W 4/024 340/10.3 |
| 2015/0112774 A1* | 4/2015 | Georgoff | G06Q 30/0207 705/14.1 |
| 2015/0365306 A1* | 12/2015 | Chaudhri | G06F 3/0482 715/736 |
| 2016/0036894 A1* | 2/2016 | Collins | H04L 67/18 709/201 |
| 2016/0112830 A1* | 4/2016 | Soon | H04W 4/029 455/456.1 |
| 2016/0292507 A1* | 10/2016 | Ghoson | G06K 9/22 |
| 2017/0039242 A1* | 2/2017 | Milton | G06Q 30/0269 |
| 2017/0046753 A1* | 2/2017 | Deupree, IV | G06Q 30/0201 |
| 2017/0109609 A1* | 4/2017 | Hill | G06Q 30/00 |
| 2018/0349381 A1* | 12/2018 | Shi | G06F 16/487 |

FOREIGN PATENT DOCUMENTS

| | | |
|---|---|---|
| EP | 2 144 469 A2 | 1/2010 |
| EP | 2 262 288 A1 | 12/2010 |
| WO | WO 2016/019354 A1 | 2/2016 |

OTHER PUBLICATIONS

Notification of the First Office Action dated Jun. 18, 2020 corresponding to Chinese Patent Application No. 2016800920839, and English translation thereof.

\* cited by examiner

LOCATION RELATED APPLICATION MANAGEMENT

BACKGROUND

Field

The present invention relates to apparatuses, methods, systems, computer programs, computer program products and computer-readable media usable for conducting a location related application management, in particular in a mobile edge computing system working in a communication network.

Background Art

The following description of background art may include insights, discoveries, understandings or disclosures, or associations, together with disclosures not known to the relevant prior art, to at least some examples of embodiments of the present invention but provided by the invention. Some of such contributions of the invention may be specifically pointed out below, whereas other of such contributions of the invention will be apparent from the related context.

The following meanings for the abbreviations used in this specification apply:
3GPP: $3^{rd}$ Generation Partner Project
ACK: acknowledgement
API: application programming interface
appl.: application
BS: base station
CN: core network
CPU: central processing unit
DB: database
eNB: evolved node B
EPC: evolved packet core
ETSI European Telecommunications Standards Institute
GW: gateway
ID: identification, identifier
IP: Internet protocol
LTE: Long Term Evolution
LTE-A: LTE Advanced
ME: mobile edge
MEC: mobile edge computing
MEP: mobile edge platform
MME: mobility management entity
NACK: non-acknowledgement
RNIS: radio network information service
SDL: shared data layer
TA: tracking area
TAU: tracking area update
UE: user equipment
UMTS: universal mobile telecommunication system
URL: uniform resource locator Embodiments of the present invention are related to a mechanism which allows a reliable and accurate provision of location information to an application running on a mobile edge computing platform.

SUMMARY

According to an example of an embodiment, there is provided, for example, an apparatus for use by a mobile edge control element or function, comprising at least one processing circuitry, and at least one memory for storing instructions to be executed by the processing circuitry, wherein the at least one memory and the instructions are configured to, with the at least one processing circuitry, cause the apparatus at least: to receive and process an event report indicating that location information of a communication element communicating in a communication network are provided, to check location related application information for determining whether or not a relationship of at least one application to a location corresponding to the location information indicated in the event report is present, to prepare, in case the check is affirmative, an application identification indication for indicating at least one location area where location information of the communication element is of relevance for a processing conducted by at least one application, and to ensure that the communication element is informed about the application identification indication.

Furthermore, according to an example of an embodiment, there is provided, for example, a method for use by a mobile edge control element or function, comprising receiving and processing an event report indicating that location information of a communication element communicating in a communication network are provided, checking location related application information for determining whether or not a relationship of at least one application to a location corresponding to the location information indicated in the event report is present, preparing, in case the check is affirmative, an application identification indication for indicating at least one location area where location information of the communication element is of relevance for a processing conducted by at least one application, and ensuring that the communication element is informed about the application identification indication.

According to further refinements, these examples may include one or more of the following features:
- the event report may be received from a communication network control element or function and processing the event report as being related to an attachment procedure of the communication element or a location change procedure of the communication element concerning exiting or entering a location area controlled by the communication network control element or function;
- the event report may be received via a radio network information service related interface or an interface between the mobile edge control element or function and the communication network control element or function;
- the event report may include at least one of an identification of the communication element, an identification of a user of the communication element, an identification of the location area to which the location information is related, and a time related indication related to the event;
- the location related application information may concern a relationship of at least one application running at the mobile edge control element or function to at least one specified location area, wherein the relationship may concern at least one of an availability of the at least one application in the at least one specified location area for communication elements, and a request that the at least one application is informed about each communication element when a location change of the communication element concerns the at least one specified location area;
- the location related application information may be checked on the basis of at least one of a usage of a database or a shared data layer, and a usage of data being interchanged with at least one further mobile edge control element or function.

the application identification indication may include at least one of an identification of at least one application, an identification of at least one location area or zone in the location area, cell information related to at least one location area or zone in the location area, operating instructions for the communication element when a location change concerns at least one location area or zone in the location area, and an indication of priority for conducting a contacting of at least one application;

for ensuring that the communication element is informed about the application identification indication, a transmission of the application identification indication to the communication element may be caused, wherein the transmission may be caused via one of an application level signaling with a counterpart of the communication element, and a control plane signaling via the communication network control element or function from which the event report is received;

it may be determined whether there have been made changes in the location related application information since a time when the communication element has been informed about the application identification indication the last time, and when it is determined that changes have been made, preparation and transmission of the application identification indication to the communication element may be caused;

the mobile edge control element or function may be one of a mobile edge computing server and a mobile edge platform, the communication network control element or function may be one of an access network control element or function of a cellular communication network and a mobility management element or function of a cellular communication network, and the communication element may be a user equipment or terminal device capable of communicating in the cellular communication network.

Furthermore, according to an example of an embodiment, there is provided, for example, an apparatus for use by a communication element, the apparatus comprising at least one processing circuitry, and at least one memory for storing instructions to be executed by the processing circuitry, wherein the at least one memory and the instructions are configured to, with the at least one processing circuitry, cause the apparatus at least: to receive, after conducting a processing for providing location information in a communication network, an application identification indication indicating at least one location area where location information of the communication element is of relevance for a processing conducted by at least one application, to store the application identification indication for usage in a processing related to a location change of the communication element, to determine, when conducting a processing related to a location change of the communication element, whether the location change concerns a location indicated in the stored application identification indication, and to execute a processing for informing the communication network or at least one application related to the application identification indication about the location change, wherein the processing is also executed when the location change is conducted in an idle state of the communication element.

In addition, according to an example of an embodiment, there is provided, for example, a method for use by a communication element, the method comprising receiving, after conducting a processing for providing location information in a communication network, an application identification indication indicating at least one location area where location information of the communication element is of relevance for a processing conducted by at least one application, storing the application identification indication for usage in a processing related to a location change of the communication element, determining, when conducting a processing related to a location change of the communication element, whether the location change concerns a location indicated in the stored application identification indication, and executing a processing for informing the communication network or at least one application related to the application identification indication about the location change, wherein the processing is also executed when the location change is conducted in an idle state of the communication element.

According to further refinements, these examples may include one or more of the following features:

the processing for providing location information may be related to an attachment procedure of the communication element or a location change procedure of the communication element concerning exiting or entering a location area controlled by the communication network control element or function;

the application identification indication may include at least one of an identification of at least one application, an identification of at least one location area or zone in the location area, cell information related to at least one location area or zone in the location area, operating instructions for the communication element when a location change concerns at least one location area or zone in the location area, and an indication of priority for conducting a contacting of at least one application;

the application identification indication may be received by a transmission via one of an application level signaling with a mobile edge control element or function, and a control plane signaling with a communication network control element or function with which the processing for providing location information is conducted;

the processing related to a location change of the communication element may concern one of entering or exiting a zone in the location area when the communication element is in an idle state, wherein it may be determined whether the location change concerns a location indicated in the stored application identification indication by comparing an identification of a location area or zone in the stored application identification indication with an identification of the location being entered or exited;

when executing the processing for informing the communication network or at least one application related to the application identification indication about the location change, at least one of communicating with a communication network control element or function for indicating a current location or the location change of the communication element, communicating with a mobile edge control element or function for indicating a current location or the location change of the communication element, and communicating with the at least one application for indicating a current location or the location change of the communication element may be executed;

the communication element may be a user equipment or terminal device capable of communicating in the cellular communication network, the application may be related to a mobile edge control element or function including one of a mobile edge computing server and a mobile edge platform, and the communication network control element or function may be one of an access network control element or function of a cellular communication network and a mobility management element or function of a cellular communication network.

In addition, according to embodiments, there is provided, for example, a computer program product for a computer, including software code portions for performing the steps of the above defined methods, when said product is run on the computer. The computer program product may include a computer-readable medium on which said software code portions are stored. Furthermore, the computer program product may be directly loadable into the internal memory of the computer and/or transmittable via a network by means of at least one of upload, download and push procedures.

BRIEF DESCRIPTION OF THE DRAWINGS

Some embodiments of the present invention are described below, by way of example only, with reference to the accompanying drawings, in which.

DESCRIPTION OF EMBODIMENTS

Figure 1:
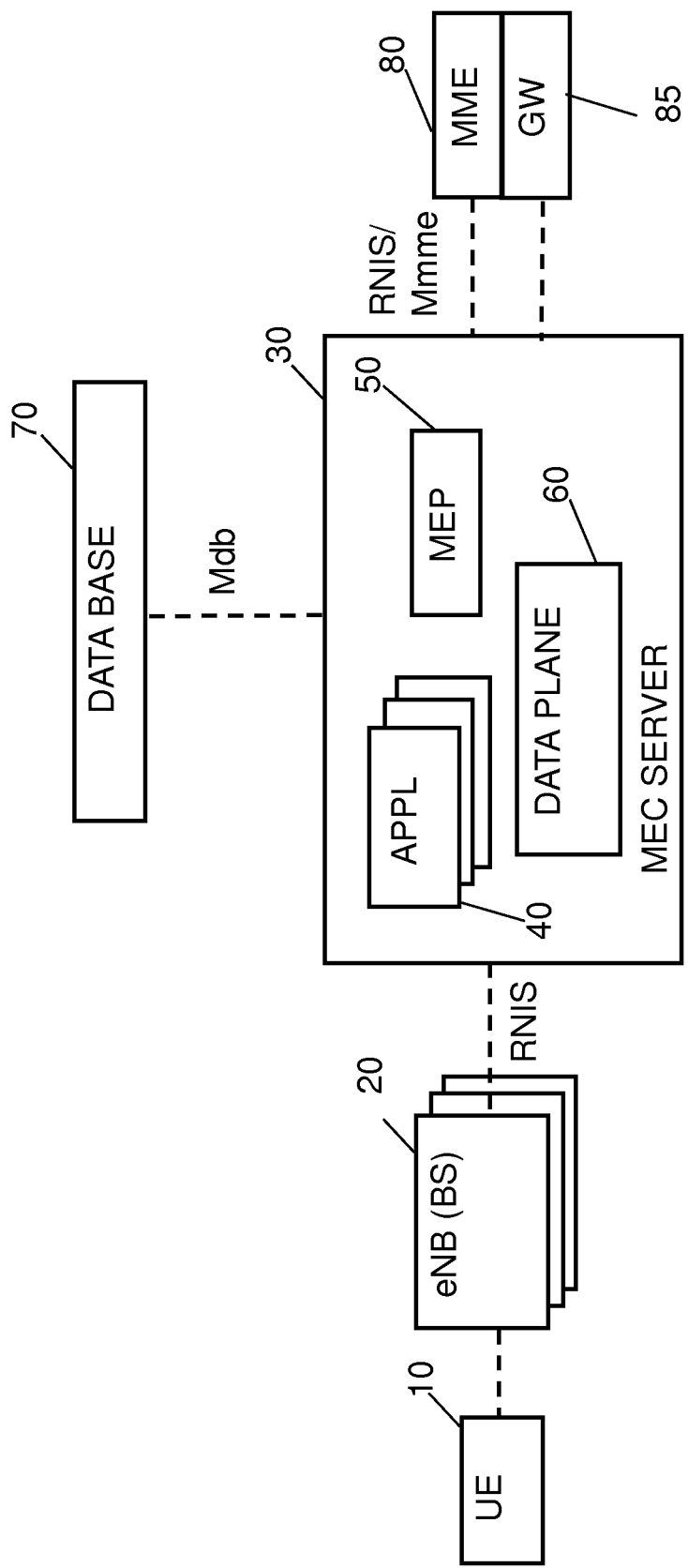
FIG. 1 shows a diagram illustrating a configuration of communication network environment where some examples of embodiments are implementable.

In the last years, an increasing extension of communication networks, e.g. of wire based communication networks, such as the Integrated Services Digital Network (ISDN), DSL, or wireless communication networks, such as the cdma2000 (code division multiple access) system, cellular $3^{rd}$ generation (3G) like the Universal Mobile Telecommunications System (UMTS), fourth generation (4G) communication networks or enhanced communication networks based e.g. on LTE or LTE-A, fifth generation (5G) communication networks, cellular $2^{nd}$ generation (2G) communication networks like the Global System for Mobile communications (GSM), the General Packet Radio System (GPRS), the Enhanced Data Rates for Global Evolution (EDGE), or other wireless communication system, such as the Wireless Local Area Network (WLAN), Bluetooth or Worldwide Interoperability for Microwave Access (WiMAX), took place all over the world. Various organizations, such as the European Telecommunications Standards Institute (EISI), the $3^{rd}$ Generation Partnership Project (3GPP), Telecoms & Internet converged Services & Protocols for Advanced Networks (TISPAN), the International Telecommunication Union (ITU), $3^{rd}$ Generation Partnership Project 2 (3GPP2), Internet Engineering Task Force (IETF), the IEEE (Institute of Electrical and Electronics Engineers), the WiMAX Forum and the like are working on standards or specifications for telecommunication network and access environments.

Generally, for properly establishing and handling a communication connection between two or more end points (e.g. communication stations or elements, such as terminal devices, user equipments (UEs), or other communication network elements, a database, a server, host etc.), one or more network elements such as communication network control elements, for example access network elements like access points, radio base stations, eNBs etc., and core network elements or functions, for example control nodes, support nodes, service nodes, gateways etc., may be involved, which may belong to one communication network system or different communication network systems.

Mobile edge computing (MEC) is currently under development in the telecommunication field. MEC provides IT and cloud-computing capabilities within a radio access network in close proximity to mobile subscribers. For application developers and content providers, the access network edge offers a service environment with low latency and high-bandwidth as well as direct access to real-time radio network information (such as subscriber location, cell load, etc.) that can be used by applications and services to offer, for example, context-related services. Furthermore, applications and services offered by a MEC server may be provided by different service providers. Applications and services offered by a MEC server may be used by network users/subscribers either in sessions between a communication element such as a UE and a server element, also referred to as a MEC server, or as intermediate data flow manipulators in sessions between a UE and e.g. the Internet.

The key element of MEC is the MEC server (or MEC host). The MEC server is, for example, integrated at a radio access network element, e.g. in an eNB site, or at a radio network controller element or a multi-technology (e.g. 3G/LTE) cell aggregation site. The MEC server provides computing resources, storage capacity, connectivity, and access to user traffic and radio and network information. For this purpose, a MEC server platform consists of several parts including a hosting infrastructure and an application platform. The MEC hosting infrastructure consists, for example, of hardware resources and a virtualization layer. The MEC application platform provides the capabilities for hosting applications and consists of the application's virtualization manager and application platform services. These MEC application-platform services provide middleware services to the applications which are hosted on the MEC server, such as an infrastructure service, communication services, location service, service registry, radio network information services (RNIS) and traffic offload function.

For example, the location service function on a MEC server receives queries and subscriptions on UE locations and location changes from applications, and provides the applications with UEs in given locations and/or zones and with location information of the UEs. On the other hand, RNIS is a service that provides radio network related information to mobile edge applications and to mobile edge platform.

Since MEC allows cloud application services to be hosted alongside mobile network elements and also facilitates leveraging of the available real-time network and radio information, RNIS provides authorized applications with low-level radio and network information, which can be used by applications to calculate and present e.g. a cell-ID, location of the user/subscriber, cell load and throughput guidance. Furthermore, the RNIS may deliver information from the radio network relating to users and cells, and provides indications relating to the activation of a UE on a specific mobile network element. These include parameters on the UE context and the established radio access bearer, such as QoS, cell ID for the radio access bearer, ID of the UE-associated logical signaling connection, etc. In addition, information on current radio conditions are shared via mobile edge platforms over RNIS.

The granularity of radio network information can be adjusted based on parameters such as information per cell, per UE, or it can be requested over period of time. On a high level, the information provided can be up-to-date radio network information regarding radio network conditions, measurement and statistics information related to the user plane based on 3GPP specifications, information about UEs connected to the radio node(s) associated with the mobile edge host, their UE context and the related radio access bearers, and changes on information related to UEs connected to the radio node(s) associated with the mobile edge host, their UE context and the related radio access bearers.

In the following, different exemplifying embodiments will be described using, as an example of a communication network to which the embodiments may be applied, a communication network architecture based on 3GPP standards, such as LTE or LTE-A communication networks, without restricting the embodiments to such architectures, however. It is obvious for a person skilled in the art that the embodiments may also be applied to other kinds of communication networks having suitable means by adjusting parameters and procedures appropriately, e.g. 5G networks, WiFi, worldwide interoperability for microwave access (WiMAX), Bluetooth®, personal communications services (PCS), ZigBee®, wideband code division multiple access (WCDMA), systems using ultra-wideband (UWB) technology, mobile ad-hoc networks (MANETs), wired access, etc. Furthermore, without loss of generality, the description of some examples of embodiments is related to a mobile edge computing (MEC) environment, but principles of the invention can be extended and applied to any other type of combinations of radio access networks and IT computing configurations being similar or comparable to MEC principles.

The following examples and embodiments are to be understood only as illustrative examples. Although the specification may refer to "an", "one", or "some" example(s) or embodiment(s) in several locations, this does not necessarily mean that each such reference is related to the same example(s) or embodiment(s), or that the feature only applies to a single example or embodiment. Single features of different embodiments may also be combined to provide other embodiments. Furthermore, terms like "comprising" and "including" should be understood as not limiting the described embodiments to consist of only those features that have been mentioned; such examples and embodiments may also contain features, structures, units, modules etc. that have not been specifically mentioned.

A basic system architecture of a (tele)communication network including a communication system where some examples of embodiments are applicable may include an architecture of one or more communication networks including a wired or wireless access network subsystem and a core network. Such an architecture may include one or more communication network control elements, access network elements, radio access network elements, access service network gateways or base transceiver stations, such as a base station (BS), an access point (AP), a NodeB (NB) or an eNB, which control a respective coverage area or cell(s) and with which one or more communication stations such as communication elements, user devices or terminal devices, like a UE or a vehicle, or another device having a similar function, such as a modem chipset, a chip, a module etc., which can also be part of a station, an element, a function or an application capable of conducting a communication, such as a UE, an element or function usable in a machine-to-machine communication architecture, or attached as a separate element to such an element, function or application capable of conducting a communication, or the like, are capable to communicate via one or more channels for transmitting several types of data in a plurality of access domains. Furthermore, core network elements such as gateway network elements, mobility management entities, a mobile switching center, servers, databases and the like may be included.

The general functions and interconnections of the described elements, which also depend on the actual network type, are known to those skilled in the art and described in corresponding specifications, so that a detailed description thereof is omitted herein. However, it is to be noted that several additional network elements and signaling links may be employed for a communication to or from an element, function or application, like a communication endpoint, a communication network control element, such as a server, a radio network controller, and other elements of the same or other communication networks besides those described in detail herein below.

A communication network as being considered in examples of embodiments may also be able to communicate with other networks, such as a public switched telephone network or the Internet. The communication network may also be able to support the usage of cloud services for virtual network elements or functions thereof, wherein it is to be noted that the virtual network part of the telecommunication network can also be provided by non-cloud resources, e.g. an internal network or the like. It should be appreciated that network elements of an access system, of a core network etc., and/or respective functionalities may be implemented by using any node, host, server, access node or entity etc. being suitable for such a usage.

Furthermore, a network element, such as communication elements, like a UE, a terminal device in a machine-to-machine communication, control elements or functions, such as access network elements, like a base station, an eNB, a radio network controller, other network elements, like a core network element, a mobility management element or function, a server, etc., as well as corresponding functions as described herein, and other elements, functions or applications may be implemented by software, e.g. by a computer program product for a computer, and/or by hardware. For executing their respective functions, correspondingly used devices, nodes, functions or network elements may include several means, modules, units, components, etc. (not shown) which are required for control, processing and/or communication/signaling functionality. Such means, modules, units and components may include, for example, one or more processors or processor units including one or more processing portions for executing instructions and/or programs and/or for processing data, storage or memory units or means for storing instructions, programs and/or data, for serving as a work area of the processor or processing portion and the like (e.g. ROM, RAM, EEPROM, and the like), input or interface means for inputting data and instructions by software (e.g. floppy disc, CD-ROM, EEPROM, and the like), a user interface for providing monitor and manipulation possibilities to a user (e.g. a screen, a keyboard and the like), other interface or means for establishing links and/or connections under the control of the processor unit or portion (e.g. wired and wireless interface means, radio interface means including e.g. an antenna unit or the like, means for forming a radio communication part etc.) and the like, wherein respective means forming an interface, such as a radio communication part, can be also located on a remote site (e.g. a radio head or a radio station etc.). It is to be noted that in the present specification processing portions should not be only considered to represent physical portions of one or more processors, but may also be considered as a logical division of the referred processing tasks performed by one or more processors.

It should be appreciated that according to some examples, a so-called "liquid" or flexible network concept may be employed where the operations and functionalities of a network element, a network function, or of another entity of the network, may be performed in different entities or functions, such as in a node, host or server, in a flexible manner. In other words, a "division of labor" between involved network elements, functions or entities may vary case by case.

With regard to FIG. 1, a diagram illustrating a configuration of communication network environment where some examples of embodiments are implementable. It is to be noted that the structure indicated in FIG. 1 shows only a simplified architecture and hence those parts which are useful for understanding principles underlying some examples of embodiments of the invention. As also known by those skilled in the art there may be several other network elements or devices involved e.g. in a communication which are omitted here for the sake of simplicity. Furthermore, it is to be noted that links indicated in FIG. 1 are intended to show only principle examples of connections between respective network parts. It is possible that also additional or alternative links besides those indicated in FIG. 1 are provided in a corresponding network, and/or that respective network elements or functions communicate with other network elements or functions by using intermediate nodes shown or not shown in FIG. 1. It is to be noted that examples of embodiments are not limited to the number of communication stations, elements, functions, and links as indicated in FIG. 1, i.e. there may be implemented or present less of or more of the corresponding stations, elements, functions, and links than those shown in FIG. 1.

As shown in FIG. 1, a communication element 10, such as a UE, is located within a communication network. Access to the communication network is provided by control elements or functions 20, such as access points or base stations providing a wireless interface between the communication element 10 and the network, wherein as an example of such an access network element an eNB is indicated in FIG. 1. It is to be noted that more than one access network element may be provided in the network, each covering a corresponding coverage area. Furthermore, additional or alternative access network elements can be provided, which use the same or another radio access technology, such as relay nodes, micro cells, wireless local area network nodes and the like, which can be seen in the context of examples of embodiments as corresponding access network elements or functions for the UE 10.

Reference sign 30 denotes a MEC server or MEC host. The MEC server 30 comprises, for example, a ME platform (MEP) 50, a data plane 60 and one or more applications 40 running on the MEC server. The control element or function 20 (e.g. eNB) is connected to the MEC server 30 by means of a suitable interface, for example a RNIS related interface as shown in FIG. 1.

The MEP 50 is a collection of essential functionality required to run mobile edge applications on a particular virtualisation infrastructure and enable them to provide and consume mobile edge services. For example, MEP 50 is responsible for offering an environment where the mobile edge applications can discover, advertise, consume and offer mobile edge services, receiving traffic rules from a MEP manager (not shown), applications, or services, and instructing the data plane 60 accordingly, hosting mobile edge services, etc.

The data plane 60 is part of a virtualisation infrastructure providing compute, storage, and network resources, for the purpose of running mobile edge applications. The data plane 60 executes traffic rules received by the MEP 50, and routes the traffic among applications, services, the communication network, local and external networks.

Mobile edge applications 40 are instantiated on the virtualisation infrastructure of the mobile edge host based on configuration or requests validated by mobile edge management. For example, mobile edge applications are running as virtual machines (VM) on top of the virtualisation infrastructure provided by the mobile edge host, and can interact with the MEP 50 to consume and provide mobile edge services. Mobile edge applications 40 may have a certain number of rules and requirements associated to them, such as required resources, maximum latency, required or useful services, etc.

Reference sign 70 denotes a possible common data base. This includes also a SDL solution. Data base 70 is used for providing the MEC server 30 with information regarding location related application information, for example (described later). The data base 70 is connected to the MEC server 30 by means of a suitable interface, for example a Mdb interface shown in FIG. 1.

Reference signs 80/85 denote communication network control elements or functions. For example, an MME 80 and a GW 85 are provided. The control element or function 80/85 (e.g. MME) is connected to the MEC server 30 by means of a suitable interface, for example a RNIS related interface or a dedicated interface (indicated as Mmme) as shown in FIG. 1.

Even though FIG. 1 shows an example of one UE 10, a plurality of eNBs 20, one MEC server 30 and one MME/GW 80/85, it is to be noted that examples of embodiments are not limited to these numbers. More or less elements or functions can be involved in a control procedure according to examples of embodiments. For example, a group of users including a plurality of UEs may be connected to one or more MEC servers, wherein each of the MEC servers is running an application used by the respective UEs.

Furthermore, FIG. 1 shows also links or connections (such as interfaces etc.) between the respective network elements or functions. Details of these links, interfaces and connections may be implementation specific and generally known to those skilled in the art, so that a detailed description of each interface or link between the elements and functions according to an example as shown in FIG. 1 is omitted.

As described above, one possible feature in connection with MEC services is location service. Here, the location service function on the MEC server 30 (or MEP 50) receives queries and subscriptions on UEs' locations and location changes from applications 40, and provides the applications 40 with information about UEs in given locations and/or zones and with location information of the UEs.

In other words, the location service provides location related information to the MEP 50 or (authorized) applications 40. With location related information, the MEP 50 or applications 40 performs, for example, active device location tracking, location-based service recommendation, etc. The location service provides, for example, location information of specific UEs currently served by radio node(s) associated with the MEC server 30, location information of all UEs currently served by radio node(s) associated with the MEC server 30, location information of a certain category of UEs currently served by radio node(s) associated with the MEC server 30, a list of UEs in a particular location area, the specific UEs move in or out of a particular location area, and information about the location of all radio nodes currently associated with the MEC server 30. It is to be noted that a location in the above meaning includes a geolocation, such as a geographical coordinates, a logical location, such as a cell ID or another type of zone, an absolute location and a relative location e.g. a distance or the like.

Figure 2:
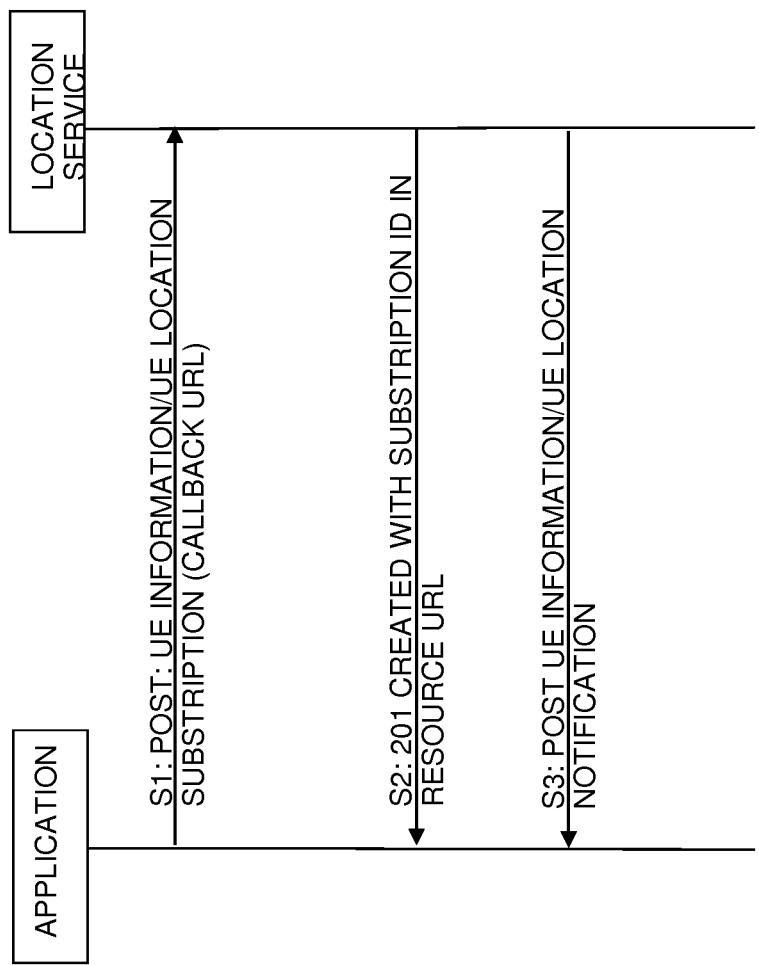
FIG. 2 shows a signaling diagram illustrating a sequence of a location service processing.

The location service may be configured to support a location subscribe mechanism. That means that the location is able to be reported multiple times for each location request, periodically or based on specific event, such as location change. FIG. 2 shows a signaling diagram illustrating a sequence of such a location service processing.

In the example of FIG. 2, a UE location subscribe or UE information subscribe procedure is illustrated. This procedure is used for applications acquiring up-to-date location information of a specific UE or a group of UEs in a period, which help the applications to track the UE(s). Alternatively or additionally, applications can acquire up-to-date UEs information in a particular location. In the procedure, the location service will continue to report the subscribed information until the subscribing is cancelled.

In S1, an ME application subscribes UE location notification and/or UE information notification by using a POST method to submit the ueLocationSubscription (or ueInformationSubscription) data structure to the resource containing all the subscriptions, which includes UE(s) identifier, e.g. UE IP address, and a callbackURL for receiving the UE location/UE information.

In S2, the location service returns a 201 CREATED response with resource URL containing the subscription ID.

In S3, the location service reports the up-to-date subscribed information to the ME application by sending a POST message with the message body containing a ueLocationNotification (or ueInformationNotification) data structure to the callbackURL, which includes location information (or UE(s) information in the location area).

In order to ensure that the above described procedures of the location service work properly, it is necessary that the location information of UEs, which includes also information regarding a location change of the UEs, such as regarding UEs entering and exiting given/defined zones, is available to the MEC Server/MEP.

However, there are situations where this is not the case. For example, when UE 10 does not have a user session in an active state, the UE 10 is in a so-called idle state. In practice, a UE of an average subscriber is typically in the idle state most of the time. When UE 10 being in the idle state moves from the location area to another location area, e.g. from the coverage of one eNB to the coverage area of another eNB, the network (including the eNBs) does not know this. Consequently, the location information of a moving UE in the network may often be outdated, since the location information known to the network (and hence used, e.g., for location service) shows the location where the UE 10 last time had a user session, i.e. was in the connected state. In fact, the location information of the UE (in idle state) is only up-to-date when attaching to the network or when exiting or entering a tracking area (TA), where the UE updates its location information to the network (i.e. in a TAU, for example).

Consequently, when in a location service related procedure an application 40 queries/requests a UE's location from a conventional MEC server/MEP, the location information of the UE is possibly out of date/invalid. Furthermore, when an application subscribes to information on UEs exiting and/or entering a zone or access point (as in FIG. 2, for example) the conventional MEC server/MEP may not be able to report such events related to exiting a zone or access point, or entering a zone or access point, because the actual location of UEs in idle state are not followed by the network (at least not within a tracking area). Consequently, important use cases of the location service are made impossible or are at least restricted.

Next, examples of embodiments of a location related application management configuration which is usable for overcoming this situation will be described with reference to the figures.

In order to cope with the above discussed situation, i.e. to avoid that invalid or inaccurate location information has to be used for location service purposes, according to some examples of embodiments, a mobile edge control element or function, such as the MEC server 30/MEP 50 maintains, or has access to, information about applications registered/available at the MEC server.

Specifically, the MEC server 30/MEP 50 maintains (or has access to) information about the relationships of the applications to locations (e.g. radio cells, zones, access points or the like). For example, a certain application, or an instance of the application, may be available or usable in a given location or several locations, and the MEC server 30/MEP 50 is aware of this dependency (i.e. the location related application information). Another example is that a certain application, or an instance of the application, may need or wish certain users/UEs (e.g. a certain category of users), or all users/UEs, to be available (i.e. known) to the application, when a location change of the UE concerns a certain location, e.g. when they enter a given location (e.g. a radio cell) or exit the location, wherein the MEC server 30/MEP 50 again knows these dependencies.

When a UE provides location information to the network, e.g. in a usual manner like during a tracking area update (TAU) or attachment to a network, e.g. via an eNB 20 under the MEC server 30, the MEC server 30/MEP 50 is informed about this event, i.e. it obtains a corresponding event report that location information of a UE is provided. For example, the MEP 50 acquires the information via a radio network information service (RNIS) communication from a network control element or function, such as from MME 80 or eNB 20 (e.g. via the RNIS interfaces indicated in FIG. 1). Alternatively, other communication paths between the MEC server 30/MEP 50 and the network control element or function can be used, e.g. from MME 80 via an interface between MEP 50 and MME 80 (e.g. via the Mmme interface in FIG. 1).

That is, according to examples of embodiments, the event report, i.e. the reporting of a UE (e.g. UE 10) entering or exiting a tracking area to a mobile edge control element or function, e.g. to the MEC server 30 (or a plurality of MEC servers, if present) may be implemented in different ways.

As one example, there is established an interface between the network control element or function, such as the MME 80, and the MEC server 30, wherein the MME 80 may send the necessary information (e.g. the event report) to the MEC server(s). As another example, there is an interface between the eNB 20 and MEC server 30, wherein the eNB 20 sends the information to the MEC server 30. In both cases, according to examples of embodiments, the interface being used is an RNIS related interface (RNIS is for example a part of a MEC server and is supposed to acquire radio network related information for the MEC server, wherein RNIS interfaces may be established to one or both of eNBs and MME as network control elements or functions).

According to examples of embodiments, the content of the event report may vary. For example, the event report to the MEC server 30/MEP 50 may comprise information like user/UE ID, location information (e.g. a cell ID of the entered cell or an access point name), time related information (e.g. a time stamp) related to the event, i.e. when the location change happens, and the like.

On the MEC server 30 side, when such a notification (i.e. the event report) is received, the MEP 50 checks if there are applications on the MEC servers in the location area to which the (current) location information is related, such as a tracking area (TA) to which the UE changes as indicated in the TAU, which need or wish that the UE contacts the application when a location change concerns a specific location, for example when the UE enters/leaves a given zone (e.g. a certain cell) within the TA. This check is based on the location related application information the MEC server 30/MEP 50 maintains, or has access to. For example, the checking can be based on using a common DB (data base 70) or on using SDL by MEC servers/MEPs, or on mutual information exchange between several MEC servers/MEPs (i.e. when a plurality of MEC servers/MEPs is available).

In case it is found out in the check that at least one application exists in the location area (e.g. the TA), the MEP 50 prepares a corresponding indication to the UE 10, which is referred to as an application identification indication. That is, the MEP prepares to send the UE a message with information allowing the UE 10 to recognize that in case a location change is done it has to be ensured that the location of the UE is known to the network and/or application in question. For this purpose, for example, the application identification indication indicates the application ID(s) and related zone/cell info, which have been determined in the check of the location related application information. According to further examples of embodiments, the application identification indication may comprise additional parameters, e.g. a priority/importance indication related to the contacting of the applications, operating instructions for the UE in case the requirement to inform the network/application is recognized (e.g. change of operation state from idle to connected) and the like.

According to examples of embodiments, the application identification indication can be sent towards the UE 10 on different ways. For example, the MEP 50 initiates to send the message as an application level message between the MEP 50 and a client/counterpart in the UE 10.

Another way is that the MEC server 30 utilizes an existing or ongoing control plane signaling. For this purpose, the MEP 50 prepares a request to be sent to a control element of the network, such as to the MME 80, in order to request the MME 80 to forward the required information to the UE 10. The MME 80 may then use a control plane signaling message, e.g. a TAU accept or a response to the attach request message (i.e. a control place signaling related to the provision of the location information). Alternatively, also other message types, such as a dedicated signaling, may be used to send the information to the UE 10.

That is, according to examples of embodiments, the sending of information indicating the critical applications and zones, such as the application identification indication informing about the application and zone related information, from the MEC server/MEP to the UE can be implemented in different ways. As one example, a corresponding message is signalled as an application level message between the MEP 50 and a client/counterpart in the UE 10. The advantage of such a processing using an application level signalling is e.g. that there is no impact on or requirements for the underlying access network.

As another example, an existing/ongoing control plane signalling is utilized, so that the MEP 50 sends a request to the MME 80 or the eNB 20, for example, which then forwards the information to the UE 10 in a control plane message. The advantage of this processing using the control plane signalling is that the signalling exchange between the network and the UE can be decreased, but it is to be noted that the underlying access network may require modifications and new parameters may be necessary to existing messages.

It is to be noted that according to other examples, the MEP 50 may introduce a further check instance. This check can be done e.g. before preparing the message or before deciding to send the message to the UE 10. Specifically, this additional check instance is to determine as to whether or not the location related application information for the location area in question (e.g. the TA) has been updated since the UE visited this TA the last time. Specifically, it can be determined whether any changes in the application listed in the location related application information or in location (e.g. zones) related information are made. In case it is determined that there was an update, the MEP 50 decides to send the message (i.e. the application identification indication) to the UE 10. Otherwise, in case there are no related updates (e.g. when the last visit of the UE was only a short time beforehand), the MEP 50 may decide that it is not necessary to send the application identification indication to the UE (again), since it assumes that the required information are already present at the UE side. By means of this, a message exchange load can be minimized.

On the UE side, assuming that the UE is configured to support procedures according to the invention, as is the case for UE 10 of FIG. 1, the UE 10 saves the received data, i.e. the application identification indication, for further use. For example, the UE 10 saves respective application ID(s) vs. zone/cell ID(s), considers also priority info and operating instructions, if present, etc.

The stored information is used, for example, when the UE conducts a location change, e.g. in an idle state. For example, when the UE 10 enters (later) a zone (e.g. a radio cell) in the idle state, it checks whether the cell ID is listed in saved application identification indication. If this is the case (i.e. the entered cell is a cell where an application is present in the MEC server requiring an information about UEs entering the cell), the UE executes a processing for informing the network and/or the application in question (the application ID can be determined from the stored application identification information with regard to the cell ID). For example, the UE 10 decides, based on the saved information (e.g. the priority, operating instructions, etc. parameters), to contact the application related/linked to the entered zone.

Alternatively or additionally, the UE 10 may decide to report its location (or location change) to the network. Also other measures may be executed, which may be indicated in the received and stored instructions.

The above discussed measures according to examples of embodiments are in particular useful for improving the location service in a MEC based system, since it is possible to prevent a situation where the location of a UE is unknown to the service which may prevent the proper use of the MEC location service.

Figure 3:
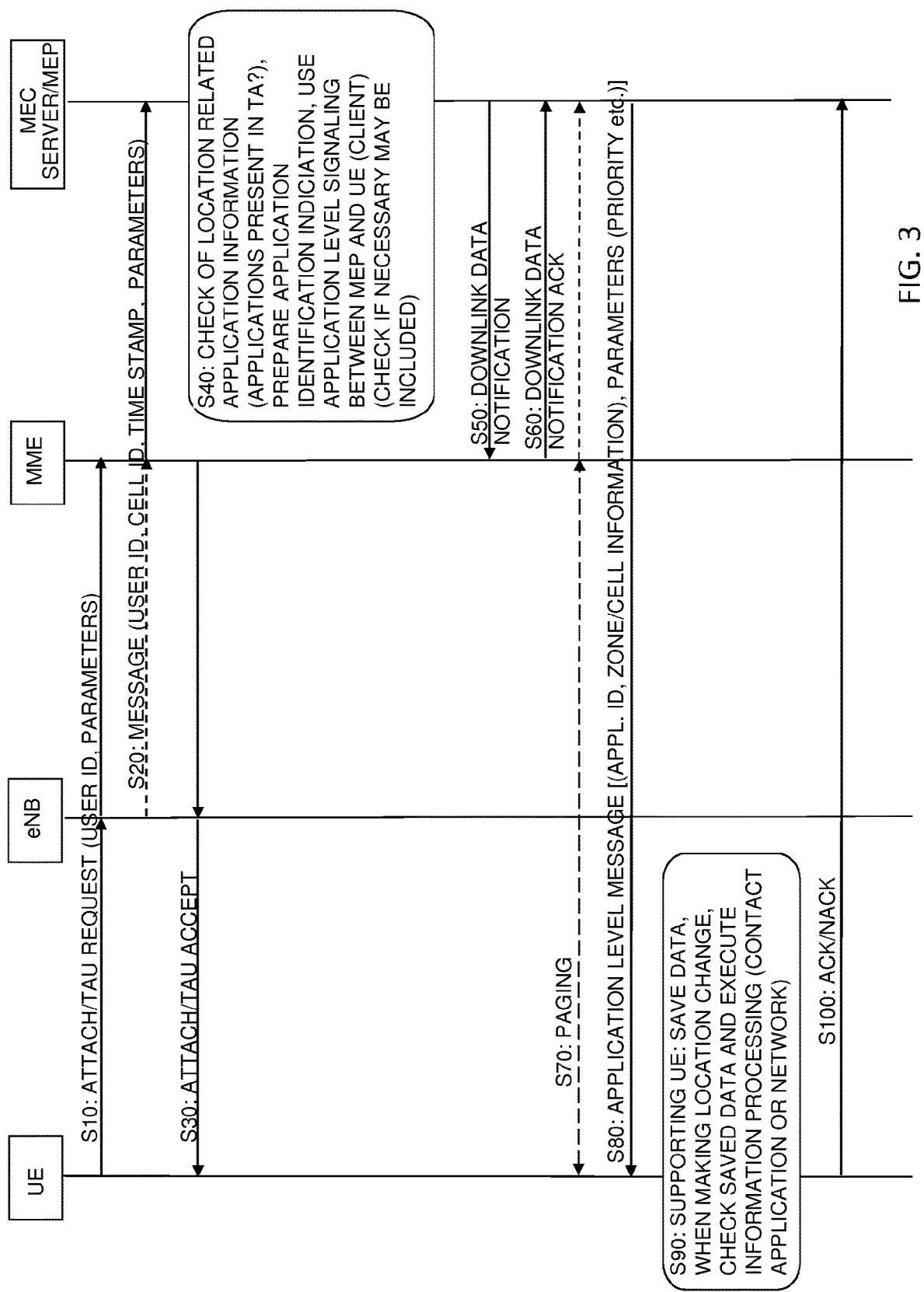
FIG. 3 shows a signaling diagram illustrating a location related application management processing according to some examples of embodiments.

FIG. 3 shows a signaling diagram illustrating an example for a location related application management processing according to some examples of embodiments. Specifically, FIG. 3 is related to a processing when location information are provided by a UE to the network, e.g. by means of a TAU, and the MEC server controlling location services uses an application level signaling for informing the UE about the application identification indication.

In S10, a TAU request is sent from the UE 10 to the network, i.e. to the eNB 20 and the MME 80, wherein the request includes information indicating the user or UE ID and other required parameters. The TAU request in S10 may be a conventional TAU request known to those skilled in the art, so that a further explanation thereof is omitted here. It is to be noted that also another processing related to location information provisioning may be initiated in S10, such as an attach request.

In S20, the control element or function of the network, e.g. the eNB 20 or the MME 80, sends a message to the MEC server 30. The message in S20 is the event report described above and comprises, for example, the user or UE ID, time stamp information related to the event, and other parameters. As indicated above, the control element or function sending the event report may be any of the MME 80 and the eNB 20, or even another control element or function of the network which is aware of the fact that location information are provided.

In S30, the network accepts the TAU (or attachment) of the UE and sends a corresponding accept message to the UE 10. Again, the processing and message in S30 may be a conventional TAU accept known to those skilled in the art, so that a further explanation thereof is omitted here.

On the other hand, in S40, the MEC server, e.g. the. MEP 50, checks if there are applications in MEC server(s) in the TA related to the location information of the UE, that need or wish the UE to contact the application when entering (or exiting) a given zone (e.g. cell). As indicated above, the checking can be done e.g. by using a common DB or SDL. In other words, the MEP 50 checks the location related application information. In case it is determined that at least one such application exists, the MEP 50 prepares a message to be sent to the UE 10, i.e. the application identification indication described above, so as to inform the UE e.g. about the application ID(s) and related zone/cell info, and possibly about other parameters, e.g. priority/importance of contacting the application, operating instructions (e.g. switch from idle state) and the like.

It is to be noted that the MEP 50 may check, as indicated above, if it is necessary to send information towards the UE 10, i.e. whether the application and/or zone information regarding the TA has been updated since the UE 10 has visited this TA the last time. This check can be done, for example, before preparing the message or before transmitting the message. In case an update is confirmed, the MEP 50 decides to send the message. If no updates are determined, the MEP 50 decides to not send the message.

In the present example, the message is sent to the UE 10 by using an application level signaling between the MEP 50 and a client/counterpart in the UE 10. Thus, after a downlink data notification is sent to the MME 80 in S50, which is acknowledged by the MME 80 to the MEP 50 in S60, the MME or MEC server/MEP conducts a paging procedure in S70 with the UE 10 via the network.

Then, in S80, an application level message including required information, such as the application ID(s), zone/cell ID(s), further parameters like priority indications etc., is forwarded to the UE 10 (in other words, the application identification indication is sent to the UE 10 by means of an application level signaling).

In S90, when the UE 10 supports the above discussed control feature, the UE 10 saves the received data (e.g. application ID vs. zone/cell, priority information, etc.). When (later) the UE 10 is entering a zone (e.g. a radio cell) which is indicated in the saved data list, the UE 10 executes a processing for informing the network and/or the application(s) indicated in the TA about the location or the location change. For example, the UE 10 decides, based e.g. on the priority etc. parameters, to contact the application linked to the entered zone, or to report its location to the network.

In S100, the UE 10 acknowledged the receipt of the message in S80.

Figure 4:
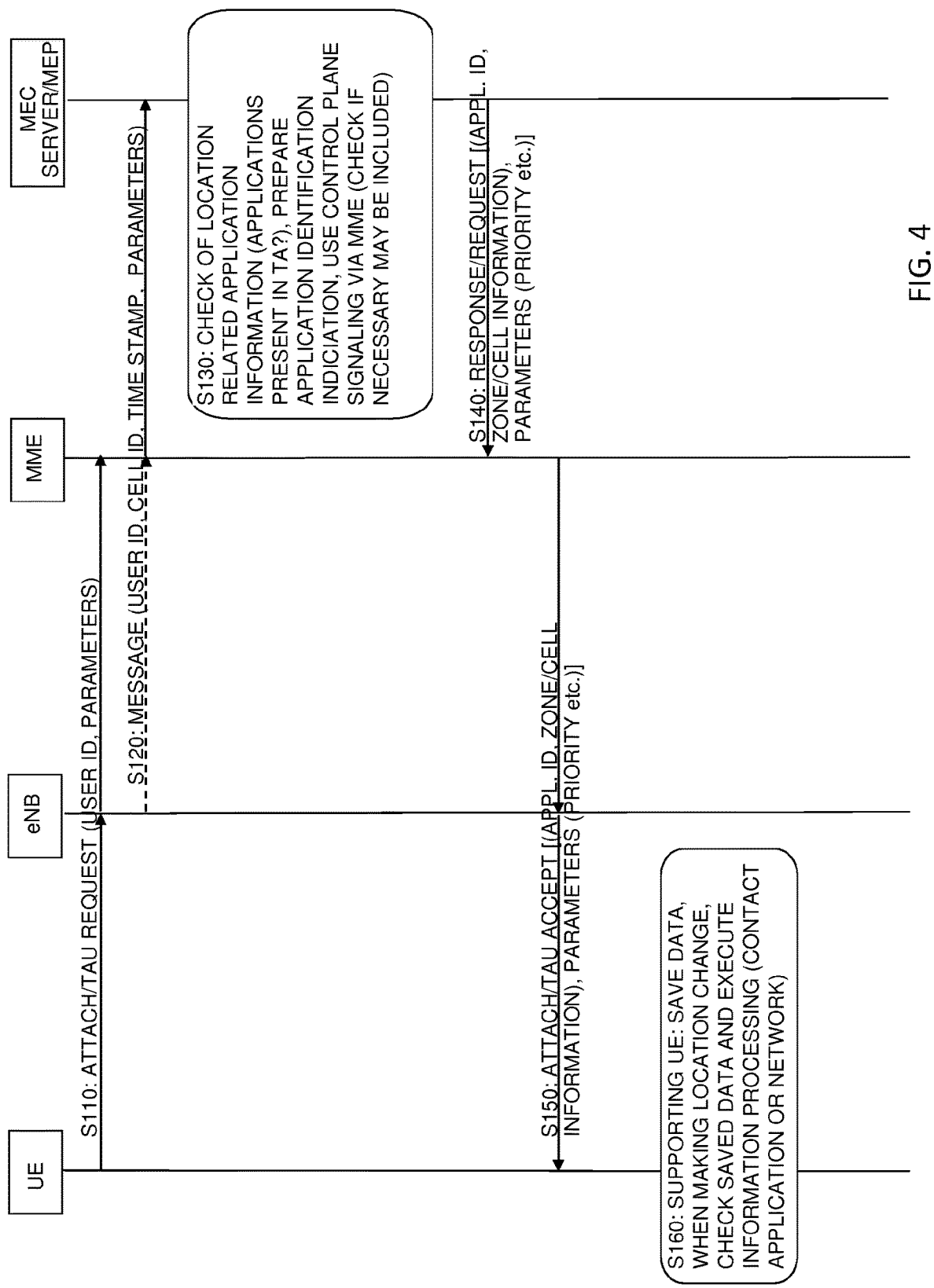
FIG. 4 shows a signaling diagram illustrating a location related application management processing according to some examples of embodiments.

FIG. 4 shows a signaling diagram illustrating another example for a location related application management processing according to some examples of embodiments. Specifically, FIG. 4 is related to a processing when location information are provided by a UE to the network, e.g. by means of a TAU, and the MEC server controlling location services uses a control plane signaling for informing the UE about the application identification indication.

In S110, a TAU request is sent from the UE 10 to the network, i.e. to the eNB 20 and the MME 80, wherein the request includes information indicating the user or UE ID and other required parameters. The TAU request in S10 may be a conventional TAU request known to those skilled in the art, so that a further explanation thereof is omitted here. It is to be noted that also another processing related to location information provisioning may be initiated in S10, such as an attach request.

In S120, the control element or function of the network, e.g. the eNB 20 or the MME 80, sends a message to the MEC server 30. The message in S20 is the event report described above and comprises, for example, the user or UE ID, time stamp information related to the event, and other parameters. As indicated above, the control element or function sending the event report may be any of the MME 80 and the eNB 20, or even another control element or function of the network which is aware of the fact that location information are provided.

In S130, the MEC server, e.g. the. MEP 50, checks if there are applications in MEC server(s) in the TA related to the location information of the UE, that need or wish the UE to contact the application when entering (or exiting) a given zone (e.g. cell). As indicated above, the checking can be done e.g. by using a common DB or SDL. In other words, the MEP 50 checks the location related application information.

In case it is determined that at least one such application exists, the MEP 50 decides to inform the UE 10, i.e. to provide application identification indication described above, so as to inform the UE e.g. about the application ID(s) and related zone/cell info, and possibly about other parameters, e.g. priority/importance of contacting the application, operating instructions (e.g. switch from idle state) and the like.

It is to be noted that the MEP 50 may check, as indicated above, if it is necessary to send information towards the UE 10, i.e. whether the application and/or zone information regarding the TA has been updated since the UE 10 has visited this TA the last time. This check can be done, for example, before preparing the message or before transmitting the message. In case an update is confirmed, the MEP 50 decides to send the message. If no updates are determined, the MEP 50 decides to not send the message.

In the present example, the informing of the UE 10 is done by means of using an existing/ongoing control place signaling. Hence, in order to utilize the existing/ongoing control plane signaling, the MEP 50 prepares a request to be sent to MME 80 in order to advise the MME 80 to forward the information of the application identification indication to the UE 10. This request is sent in S140 and may be, for example, a response to the message in S120. Alternatively, a separate request message is sent to the MME 80 in S140. The request in S140 comprises also information related to the application identification indication to be provided to the UE 10, such as the application ID(s), zone/cell ID(s), further parameters like priority indications etc.

In S150, the MME 80 (as the network control element) sends a control place signaling to the UE 10 for responding to the message in S110 (i.e. the TAU request), e.g. in the form of a TAU accept message. This control place signaling message includes also the application identification indication related information provided to the MME 80 in S140, which are included in response to the request made in S140. Hence, in S150, a message including required information, such as the application ID(s), zone/cell ID(s), further parameters like priority indications etc., is forwarded to the UE 10.

In S160, when the UE 10 supports the above discussed control feature, the UE 10 saves the received data (e.g. application ID vs. zone/cell, priority information, etc.). When (later) the UE 10 is entering a zone (e.g. a radio cell) which is indicated in the saved data list, the UE 10 executes a processing for informing the network and/or the application(s) indicated in the TA about the location or the location change. For example, the UE 10 decides, based e.g. on the priority etc. parameters, to contact the application linked to the entered zone, or to report its location to the network.

Figure 5:
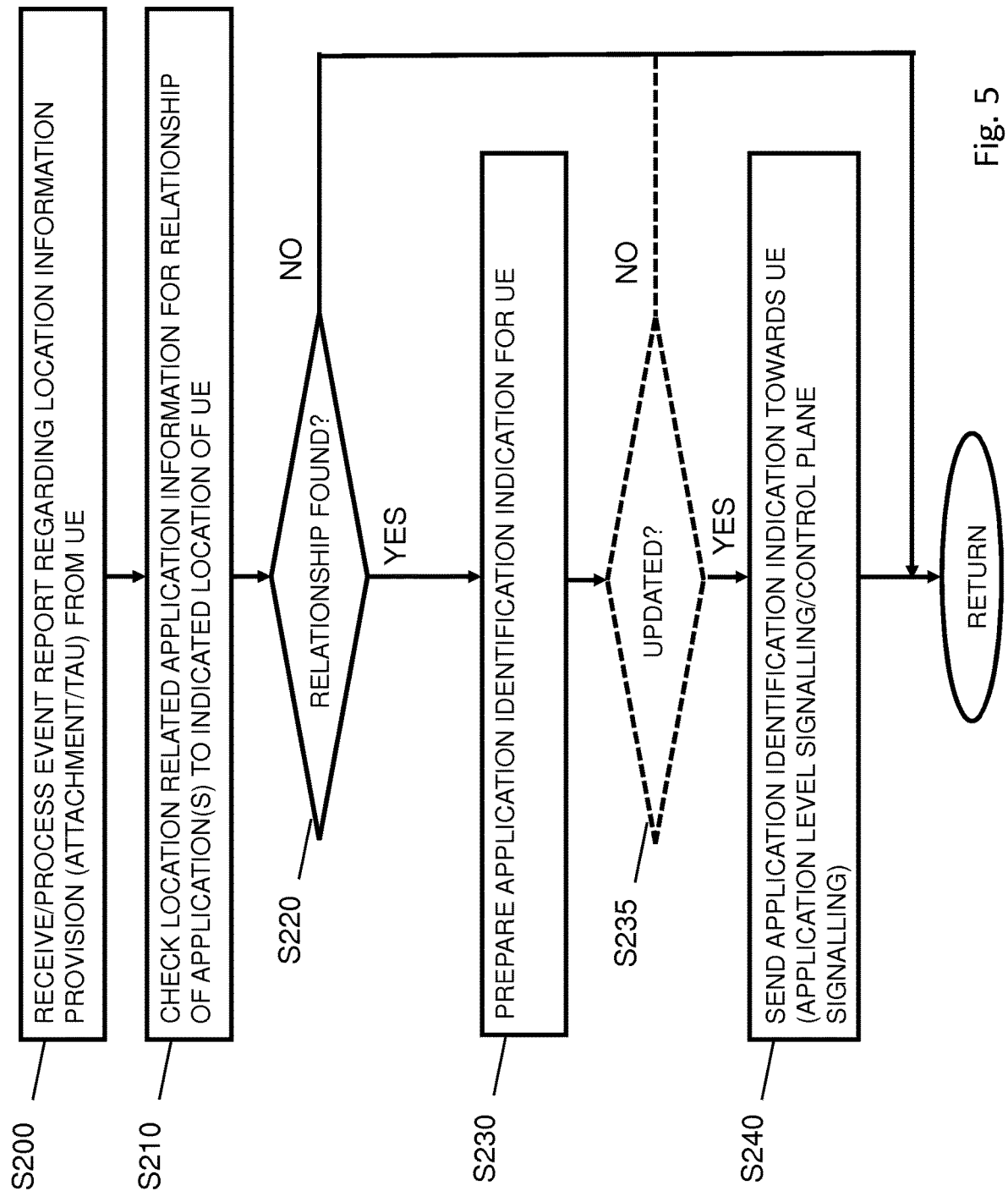
FIG. 5 shows a flow chart of a processing conducted in a mobile edge control element or function according to some examples of embodiments.

FIG. 5 shows a flow chart of a processing related to a location related application management according to some examples of embodiments. Specifically, the example according to FIG. 5 is related to a procedure conducted by a mobile edge control element or function, such as the MEC server 30/MEP 50, as shown in connection with FIGS. 3 and 4.

In S200, an event report is received and processed. The event report indicates that location information of a communication element (e.g. UE 10) communicating in a communication network are provided. For example, according to some examples of embodiments, the event report is received from a communication network control element or function (such as eNB 20, MME 80 or the like), wherein the event report is processed as being related to an attachment procedure of the communication element or a location change procedure of the communication element, the location change (e.g. TAU) concerning exiting or entering a location area (e.g. an access point, a zone, a cell or the like) controlled by the communication network control element or function.

According to further examples of embodiments, the event report is received via a radio network information service (RNIS) related interface or an interface between the mobile edge control element or function and the communication network control element or function (e.g. Mmme in FIG. 1). The event report may include varying contents, wherein at least one of these contents concerns an ID of the communication element (UE ID or the like), an identification of a user of the communication element (user ID or the like), an identification of the location area to which the location information is related (cell ID or the like), and a time related indication related to the event (time stamp or the like).

In S210, after processing of the event report, a checking processing is executed in which location related application information is checked for determining whether or not a relationship of at least one application (e.g. one or more applications 40 in FIG. 1) to a location corresponding to the location information indicated in the event report is present (for example, whether one or more applications have a relationship to the cell or access point which is entered or exited by the UE 10). According to some examples of embodiments, the location related application information concerns a relationship of at least one application running at the mobile edge control element or function to at least one specified location area, wherein the relationship may concern various situation. For example, an availability of the at least one application in the at least one specified location area for communication elements is to be provided (e.g. the application shall be available for each UE entering the zone). Alternatively or additionally, a request may be made that the application is informed about each UE entering or exiting a corresponding zone, i.e. when a location change of the UE concerns the at least one specified location area. According to some further examples of embodiments, the checking of the location related application information is made on the basis of at least one of a usage of a database (e.g. data base 70) or a shared data layer (SDL). Alternatively or additionally, a usage of data being interchanged with at least one further mobile edge control element or function can be used.

In S220, the check result is considered, i.e. whether a relationship is found or not.

If no relationship is found in S210 (i.e. there is no application), the processing returns (no in S220). Otherwise, in case a relationship is found in S210 (YES in S220), the process proceeds to S230. In S230, an application identification indication is prepared for indicating at least one location area where location information of the communication element is of relevance for a processing conducted by at least one application. For example, according to examples of embodiments, the application identification indication includes at least one of an identification of at least one application (e.g. application ID of the application requiring information about entering/exiting of the zone in question), an identification of at least one location area or zone in the location area (zone ID in question), cell information related to at least one location area or zone in the location area (cell ID), operating instructions for the communication element when a location change concerns at least one location area or zone in the location area (e.g. when being in idle state, switching to the connected state for providing location information, or direct contacting of the application, or the like), and an indication of priority for conducting a contacting of at least one application.

In S240, it is ensured that the communication element is informed about the application identification indication. For example, a transmission of the application identification indication to the communication element (UE 10) is caused. The transmission may be caused, for example, via an application level signaling with a counterpart of the communication element (as discussed, for example, in connection with FIG. 3). On the other hand, the transmission may be caused, for example, via a control plane signaling via the communication network control element or function (e.g. eNB 20, MME 80) from which the event report is received (as discussed, for example, in connection with FIG. 4).

It is to be noted that according to some further examples of embodiments, it is possible to determine, whether there have been made changes in the location related application information (checked in S210) since a time when the communication element has been informed about the application identification indication the last time. For example, this determination may be made before preparing the application identification indication (in S230) or before causing transmission of the application identification indication to the communication element (in S240), For this purpose, it is required that the last time period when the UE 10 had been in the location area (e.g. the last time when a processing as described in FIGS. 3 and 4) is known, which can be deduced, for example, from the time related information in the event report being stored in the preceding cycle. When it is determined that changes have been made in the location related application information since the last visit of the UE 10, the preparation and transmission of the application identification indication to the UE 10 are executed. On the other hand, when it is determined that no changes have been made since the last visit, it is possible to ensure that the communication element is informed about the (valid) application identification information without needing a (redundant) transmission of the information in the present cycle. Hence, it is possible to modify the processing, e.g. by skipping either a preparation of the application identification indication (i.e. to skip S230 and S240) or skipping the transmission of the application identification indication (i.e. to skip S240) in the current processing. This processing is indicated in FIG. 5 by S235 where a check for updates of the location related application information is made between S230 and S240; it is clear from the above that S235 could be also placed between S220 and S230, for example.

Figure 6:
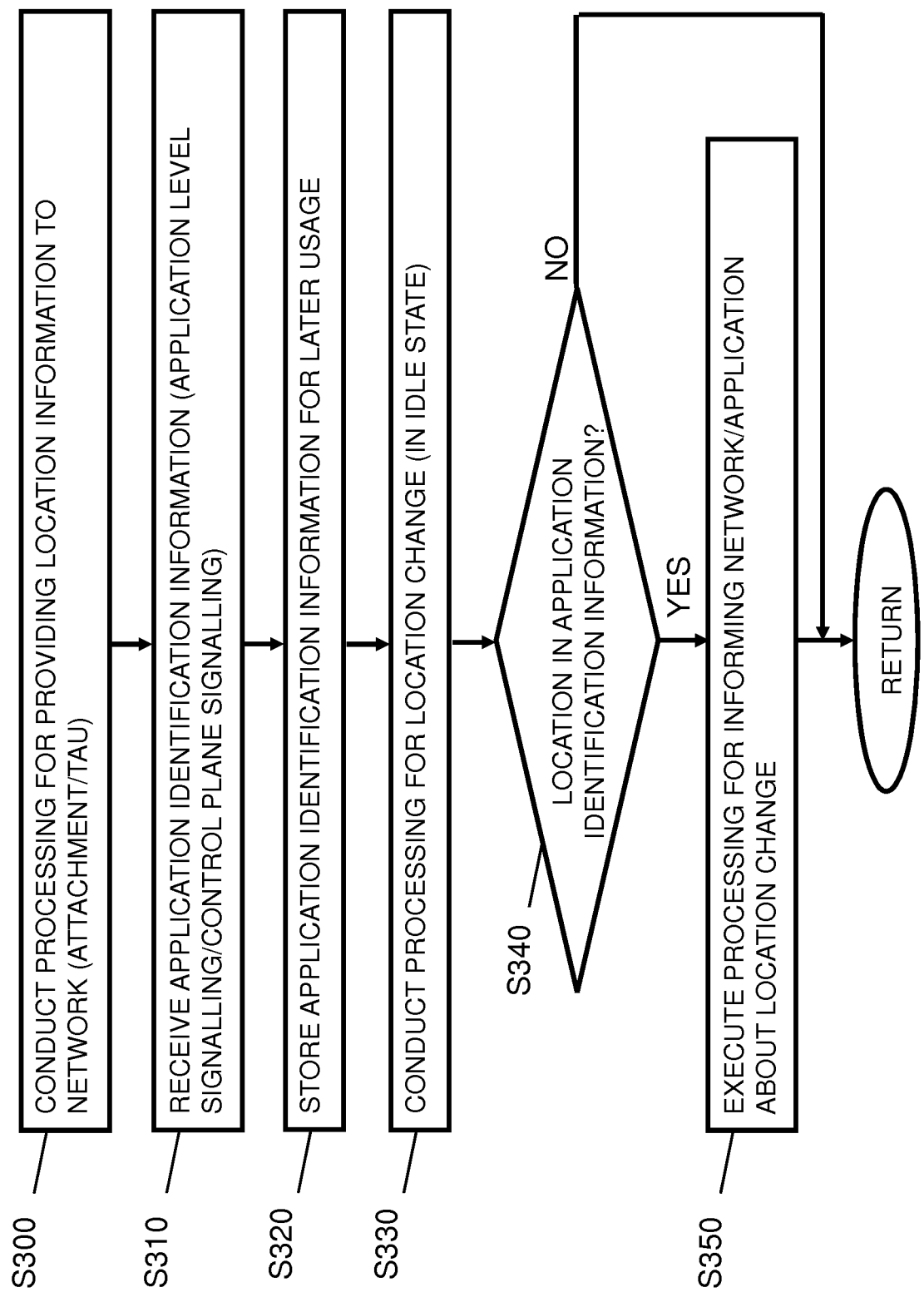
FIG. 6 shows a flow chart of a processing conducted in a communication element according to some examples of embodiments.

FIG. 6 shows a flow chart of a processing related to a location related application management according to some examples of embodiments. Specifically, the example according to FIG. 5 is related to a procedure conducted by a communication element, such as the UE 10, as shown in connection with FIGS. 3 and 4.

In 300, a processing for providing location information in a communication network is conducted. For example, according to some examples of embodiments, the processing is conducted with a communication network control element or function (such as eNB 20, MME 80 or the like), and is related to an attachment procedure of the communication element or a location change procedure of the communication element, the location change (e.g. TAU) concerning exiting or entering a location area (e.g. an access point, a zone, a cell or the like) controlled by the communication network control element or function.

S310, after conducting the processing for providing location information, an application identification indication is received which indicates at least one location area where location information of the communication element is of relevance for a processing conducted by at least one application. For example, according to examples of embodiments, the application identification indication includes at least one of an identification of at least one application (e.g. application ID of the application requiring information about entering/exiting of the zone in question), an identification of at least one location area or zone in the location area (zone ID in question), cell information related to at least one location area or zone in the location area (cell ID), operating instructions for the communication element when a location change concerns at least one location area or zone in the location area (e.g. when being in idle state, switching to the connected state for providing location information, or direct contacting of the application, or the like), and an indication of priority for conducting a contacting of at least one application.

According to some examples of embodiments, the application identification indication may be received, for example, via an application level signaling with between the UE 10 (e.g. a counterpart or client of the UE 10) and the mobile edge control element or function (as discussed, for example, in connection with FIG. 3). On the other hand, the application identification indication may be received, for example, via a control plane signaling via the communication network control element or function (e.g. eNB 20, MME 80) with which the location information provisioning procedure has been executed (as discussed, for example, in connection with FIG. 4).

S320, the application identification indication is stored for (a later) usage in a processing related to a location change of the communication element.

S330, a processing related to a location change of the communication element is conducted. For example, according to examples of embodiments, the location change is executed in a state where the UE 10 does usually not send an indication about its location to the network. Then, in S340, it is determined whether the location change concerns a location indicated in the stored application identification indication. That is, for example, when the processing related to a location change of the UE 10 concerns one of entering or exiting a zone in the location area when the communication element is in an idle state, it is determined in S340 whether the location change concerns a location indicated in the stored application identification indication e.g. by comparing an identification of a location area or zone (cell ID, zone ID or the like) in the stored application identification indication with an identification of the location being entered or exited (cell ID or zone ID registered by the UE 10 from the cell or zone concerned by the location change of the UE 10).

In case the determination is negative (NO in S340), e.g. when there is no correspondence found in the stored application identification information, the processing returns. Otherwise, when the determination is affirmative (YES in S340), the processing proceeds to S350.

In S350, a processing for informing the communication network or at least one application related to the application identification indication about the location change is executed. In this context, this processing for informing the network is also executed when the location change is conducted in an idle state of the communication element, i.e. when usually no location change indication or information about the current location is issued by the UE 1.

According to some examples of embodiments, when executing the processing for informing the communication network or at least one application related to the application identification indication about the location change, a communication with a communication network control element or function (e.g. the eNB 20 or the MME 80) for indicating a current location or the location change of the communication element is done. Alternatively or additionally, a communication with the mobile edge control element or function (MEC server 30/MEP 50) for indicating a current location or the location change of the communication element is executed. Furthermore, a direct communication with the at least one application (indicated in the application identification information) for indicating a current location or the location change of the communication element may be executed.

Figure 7:
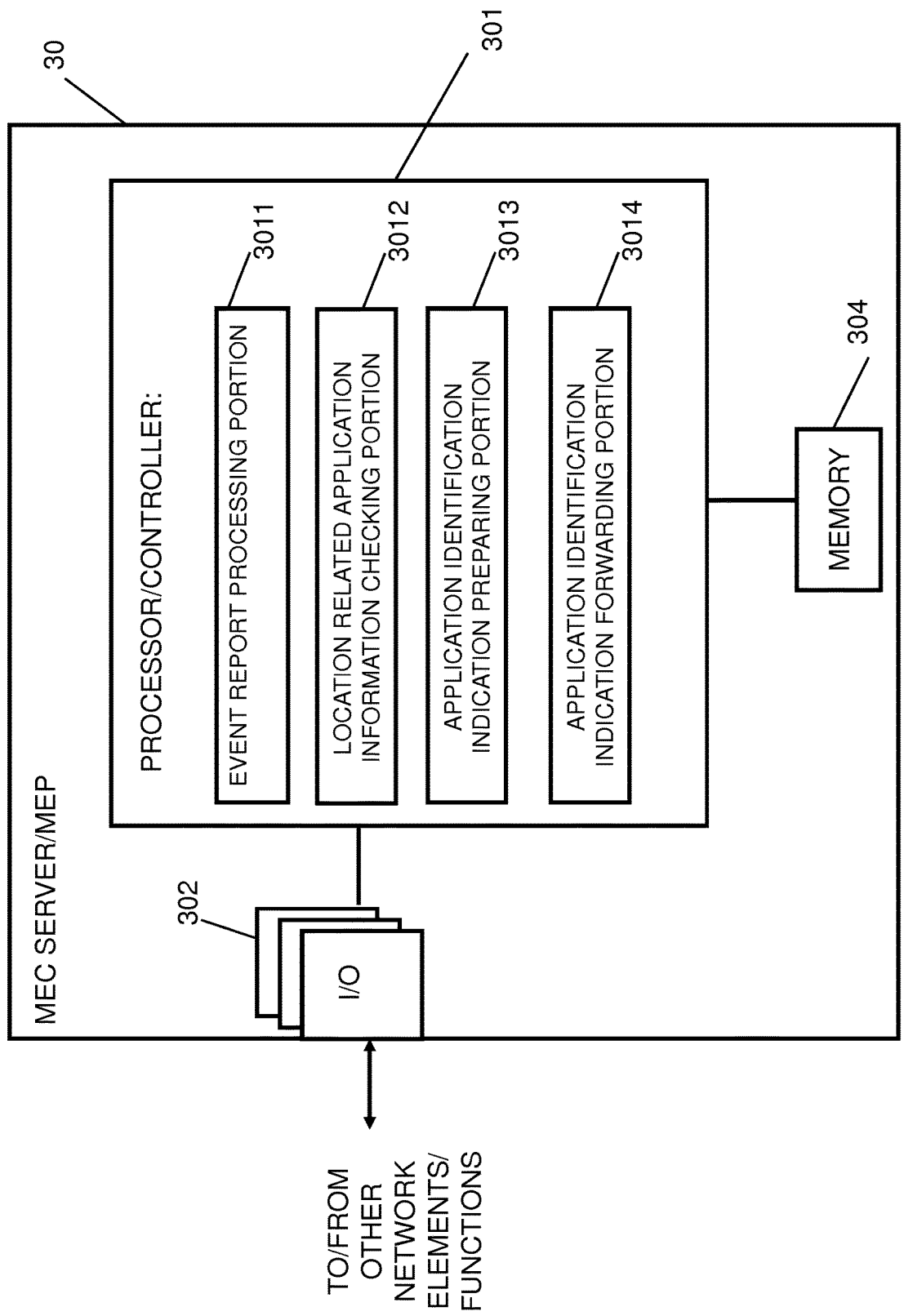
FIG. 7 shows a diagram of a network element or function acting as a mobile edge control element or function according to some examples of embodiments.

FIG. 7 shows a diagram of a network element or function acting as a mobile edge control element or function according to some examples of embodiments, e.g. as MEC server 30 or MEP 50, which is configured to implement a procedure for location related application management processing as described in connection with some of the examples of embodiments. It is to be noted that the network element or function, like the MEC server 30 of FIG. 1, may include further elements or functions besides those described herein below. Furthermore, even though reference is made to a network element or function, the element or function may be also another device or function having a similar task, such as a chipset, a chip, a module, an application etc., which can also be part of a network element or attached as a separate element to a network element, or the like. It should be understood that each block and any combination thereof may be implemented by various means or their combinations, such as hardware, software, firmware, one or more processors and/or circuitry.

The MEC server 30 shown in FIG. 7 may include a processing circuitry, a processing function, a control unit or a processor 301, such as a CPU or the like, which is suitable for executing instructions given by programs or the like related to the control procedure. The processor 301 may include one or more processing portions or functions dedicated to specific processing as described below, or the processing may be run in a single processor or processing function. Portions for executing such specific processing may be also provided as discrete elements or within one or more further processors, processing functions or processing portions, such as in one physical processor like a CPU or in one or more physical or virtual entities, for example. Reference sign 302 denotes input/output (I/O) units or functions (interfaces) connected to the processor or processing function 301. The I/O units 302 may be used for communicating with the communication network and/or other entities or functions, as described in connection with FIG. 1, for example. The I/O units 302 may be a combined unit including communication equipment towards several entities, or may include a distributed structure with a plurality of different interfaces for different entities. Reference sign 304 denotes a memory usable, for example, for storing data and programs to be executed by the processor or processing function 301 and/or as a working storage of the processor or processing function 301. It is to be noted that the memory 304 may be implemented by using one or more memory portions of the same or different type of memory.

The processor or processing function 301 is configured to execute processing related to the above described procedure for location related application management processing. In particular, the processor or processing circuitry or function 301 includes one or more of the following sub-portions. Sub-portion 3011 is a processing portion which is usable as a portion for processing an event report. The portion 3011 may be configured to perform processing according to S200 of FIG. 5. Furthermore, the processor or processing circuitry or function 301 may include a sub-portion 3012 usable as a portion for checking location related application information. The portion 3012 may be configured to perform a processing according to S210 and S220 of FIG. 5. In addition, the processor or processing circuitry or function 301 may include a sub-portion 3013 usable as a portion for preparing an application identification indication. The portion 3013 may be configured to perform a processing according to S230 of FIG. 5. Moreover, the processor or processing circuitry or function 301 may include a sub-portion 3014 usable as a portion for forwarding an application identification indication. The portion 3014 may be configured to perform a processing according to S240 of FIG. 5.

Figure 8:
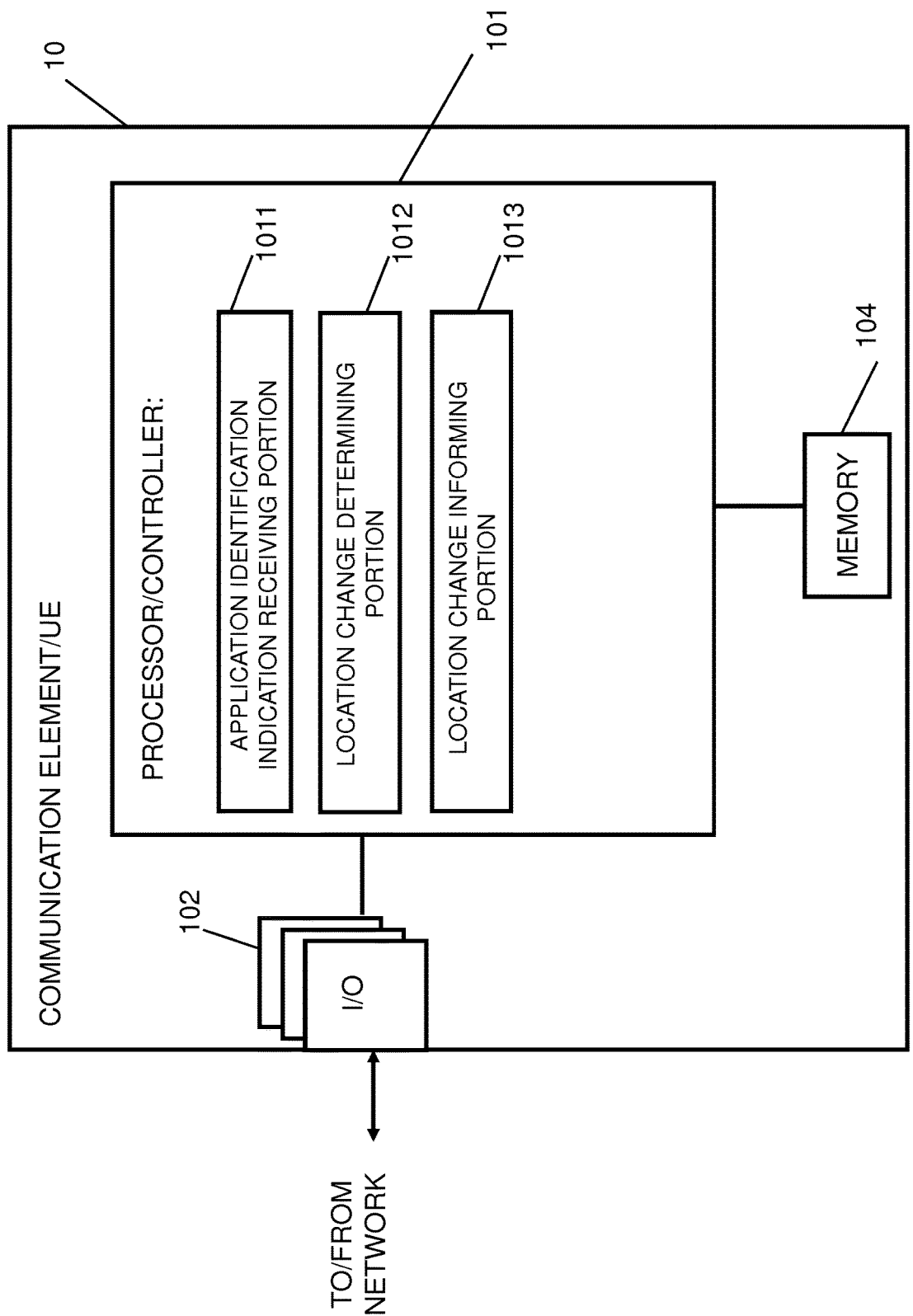
FIG. 8 shows a diagram of a network element or function acting as a communication element according to some examples of embodiments.

FIG. 8 shows a diagram of a network element or function acting as a communication element according to some examples of embodiments, e.g. as UE 10, which is configured to implement a procedure for location related application management processing as described in connection with some of the examples of embodiments. It is to be noted that the network element or function, like the UE 10 of FIG. 1, may include further elements or functions besides those described herein below. Furthermore, even though reference is made to a communication element, the element or function may be also another device or function having a similar task, such as a chipset, a chip, a module, an application etc., which can also be part of a communication element or attached as a separate element to a communication element, or the like. It should be understood that each block and any combination thereof may be implemented by various means or their combinations, such as hardware, software, firmware, one or more processors and/or circuitry.

The UE 10 shown in FIG. 8 may include a processing circuitry, a processing function, a control unit or a processor 101, such as a CPU or the like, which is suitable for executing instructions given by programs or the like related to the control procedure. The processor 101 may include one or more processing portions or functions dedicated to specific processing as described below, or the processing may be run in a single processor or processing function. Portions for executing such specific processing may be also provided as discrete elements or within one or more further processors, processing functions or processing portions, such as in one physical processor like a CPU or in one or more physical or virtual entities, for example. Reference sign 102 denotes input/output (I/O) units or functions (interfaces) connected to the processor or processing function 101. The I/O units 102 may be used for communicating with the communication network and/or other entities or functions, as described in connection with FIG. 1, for example. The I/O units 102 may be a combined unit including communication equipment towards several entities, or may include a distributed structure with a plurality of different interfaces for different entities. Reference sign 104 denotes a memory usable, for example, for storing data and programs to be executed by the processor or processing function 101 and/or as a working storage of the processor or processing function 101. It is to be noted that the memory 104 may be implemented by using one or more memory portions of the same or different type of memory.

The processor or processing function 101 is configured to execute processing related to the above described procedure for location related application management processing. In particular, the processor or processing circuitry or function 101 includes one or more of the following sub-portions. Sub-portion 1011 is a processing portion which is usable as a portion for receiving an application identification indication. The portion 1011 may be configured to perform processing according to S310 and S320 of FIG. 6. Furthermore, the processor or processing circuitry or function 101 may include a sub-portion 1012 usable as a portion for determining a location change. The portion 1012 may be configured to perform a processing according to S330 and S340 of FIG.

6. In addition, the processor or processing circuitry or function 101 may include a sub-portion 1013 usable as a portion for informing about a location change. The portion 1013 may be configured to perform a processing according to S350 of FIG. 6.

It is to be noted that examples of embodiments of the invention are applicable to various different network configurations. In other words, the example shown in FIG. 1, which is used as a basis for the above discussed examples, is only illustrative and does not limit the present invention in any way. That is, additional further existing and proposed new functionalities available in a corresponding operating environment may be used in connection with examples of embodiments of the invention based on the principles defined.

It is to be noted that the measures described in the present specification can be executed on top of common/general measures or communication procedures. Some of the measures described in the present specification can be applied separately, some in various combinations, or all measures can be combined in one procedure.

According to a further example of embodiments, there is provided, for example, an apparatus for use by a mobile edge control element or function and comprising means configured to receive and process an event report indicating that location information of a communication element communicating in a communication network are provided, means configured to check location related application information for determining whether or not a relationship of at least one application to a location corresponding to the location information indicated in the event report is present, means configured to prepare, in case the check is affirmative, an application identification indication for indicating at least one location area where location information of the communication element is of relevance for a processing conducted by at least one application, and means configured to ensure that the communication element is informed about the application identification indication.

Furthermore, according to some other examples of embodiments, the above defined apparatus may further comprise means for conducting at least one of the processing defined in the above described methods, for example a method according that described in connection with FIG. 5.

According to a further example of embodiments, there is provided, for example, an apparatus for use by a communication element and comprising means configured to receive, after conducting a processing for providing location information in a communication network, an application identification indication indicating at least one location area where location information of the communication element is of relevance for a processing conducted by at least one application, means configured to store the application identification indication for usage in a processing related to a location change of the communication element, means configured to determine, when conducting a processing related to a location change of the communication element, whether the location change concerns a location indicated in the stored application identification indication, and means configured to execute a processing for informing the communication network or at least one application related to the application identification indication about the location change, wherein the processing is also executed when the location change is conducted in an idle state of the communication element.

Furthermore, according to some other examples of embodiments, the above defined apparatus may further comprise means for conducting at least one of the processing defined in the above described methods, for example a method according that described in connection with FIG. 6.

It should be appreciated that an access technology via which traffic is transferred to and from an entity in the communication network may be any suitable present or future technology, such as WLAN (Wireless Local Access Network), WiMAX (Worldwide Interoperability for Microwave Access), LTE, LTE-A, 5G, Bluetooth, Infrared, and the like may be used; additionally, embodiments may also apply wired technologies, e.g. IP based access technologies like cable networks or fixed lines.

embodiments suitable to be implemented as software code or portions of it and being run using a processor or processing function are software code independent and can be specified using any known or future developed programming language, such as a high-level programming language, such as objective-C, C, C++, C#, Java, Python, Javascript, other scripting languages etc., or a low-level programming language, such as a machine language, or an assembler.

implementation of embodiments is hardware independent and may be implemented using any known or future developed hardware technology or any hybrids of these, such as a microprocessor or CPU (Central Processing Unit), MOS (Metal Oxide Semiconductor), CMOS (Complementary MOS), BiMOS (Bipolar MOS), BiCMOS (Bipolar CMOS), ECL (Emitter Coupled Logic), and/or TTL (Transistor-Transistor Logic).

embodiments may be implemented as individual devices, apparatuses, units, means or functions, or in a distributed fashion, for example, one or more processors or processing functions may be used or shared in the processing, or one or more processing sections or processing portions may be used and shared in the processing, wherein one physical processor or more than one physical processor may be used for implementing one or more processing portions dedicated to specific processing as described, an apparatus may be implemented by a semiconductor chip, a chipset, or a (hardware) module including such chip or chipset;

embodiments may also be implemented as any combination of hardware and software, such as ASIC (Application Specific IC (Integrated Circuit)) components, FPGA (Field-programmable Gate Arrays) or CPLD (Complex Programmable Logic Device) components or DSP (Digital Signal Processor) components.

embodiments may also be implemented as computer program products, including a computer usable medium having a computer readable program code embodied therein, the computer readable program code adapted to execute a process as described in embodiments, wherein the computer usable medium may be a non-transitory medium.

Although the present invention has been described herein before with reference to particular embodiments thereof, the present invention is not limited thereto and various modifications can be made thereto.

The invention claimed is:

1. An apparatus for use by a mobile edge control element or function, the apparatus comprising:
   at least one processor; and
   at least one memory for storing instructions to be executed by the processor;

wherein the at least one memory and the instructions are configured to, with the at least one processor, cause the apparatus at least:
to receive and process an event report indicating that location information of a communication element communicating in a communication network are provided,
to check location related application information for determining whether or not a relationship of at least one application to a location corresponding to the location information indicated in the event report is present,
to prepare, when the check is affirmative, an application identification indication for indicating at least one location area where location information of the communication element is of relevance for a processing conducted by at least one application, and
to ensure that the communication element is informed about the application identification indication.

2. The apparatus according to claim 1, wherein the at least one memory and the instructions are further configured to, with the at least one processor, cause the apparatus at least:
to receive the event report from a communication network control element or function and to process the event report as being related to an attachment procedure of the communication element or a location change procedure of the communication element concerning exiting or entering a location area controlled by the communication network control element or function.

3. The apparatus according to claim 1, wherein the at least one memory and the instructions are further configured to, with the at least one processor, cause the apparatus at least:
to receive the event report via a radio network information service related interface or an interface between the mobile edge control element or function and the communication network control element or function.

4. The apparatus according to claim 1, wherein
the application identification indication includes at least one of an identification of at least one application, an identification of at least one location area or zone in the location area, cell information related to at least one location area or zone in the location area, operating instructions for the communication element when a location change concerns at least one location area or zone in the location area, and an indication of priority for conducting a contacting of at least one application.

5. The apparatus according to claim 1, wherein the at least one memory and the instructions are further configured to, with the at least one processor, cause the apparatus at least:
to determine whether there have been made changes in the location related application information since a time when the communication element has been informed about the application identification indication the last time, and
when it is determined that changes have been made, to cause preparation and transmission of the application identification indication to the communication element.

6. The apparatus according to claim 1, wherein
the mobile edge control element or function is one of a mobile edge computing server and a mobile edge platform,
the communication network control element or function is one of an access network control element or function of a cellular communication network and a mobility management element or function of a cellular communication network, and wherein
the communication element is a user equipment or terminal device capable of communicating in the cellular communication network.

7. A method for use by a mobile edge control element or function, the method comprising:
receiving and processing an event report indicating that location information of a communication element communicating in a communication network are provided,
checking location related application information for determining whether or not a relationship of at least one application to a location corresponding to the location information indicated in the event report is present,
preparing, when the check is affirmative, an application identification indication for indicating at least one location area where location information of the communication element is of relevance for a processing conducted by at least one application, and
ensuring that the communication element is informed about the application identification indication.

8. The method according to claim 7, further comprising
receiving the event report from a communication network control element or function and processing the event report as being related to an attachment procedure of the communication element or a location change procedure of the communication element concerning exiting or entering a location area controlled by the communication network control element or function.

9. The method according to claim 7, further comprising
receiving the event report via a radio network information service related interface or an interface between the mobile edge control element or function and the communication network control element or function.

10. The method according to claim 7, wherein
the application identification indication includes at least one of an identification of at least one application, an identification of at least one location area or zone in the location area, cell information related to at least one location area or zone in the location area, operating instructions for the communication element when a location change concerns at least one location area or zone in the location area, and an indication of priority for conducting a contacting of at least one application.

11. The method according to claim 7, further comprising
determining whether there have been made changes in the location related application information since a time when the communication element has been informed about the application identification indication the last time; and
when it is determined that changes have been made, causing preparation and transmission of the application identification indication to the communication element.

* * * * *